United States Patent
Janicek

[11] Patent Number: 6,082,895
[45] Date of Patent: Jul. 4, 2000

[54] THERMISTOR

[75] Inventor: Alan J. Janicek, Morrison, Ill.

[73] Assignee: General Electric Company, Plainville, Conn.

[21] Appl. No.: 09/156,256

[22] Filed: Sep. 18, 1998

[51] Int. Cl.$^7$ .............................. G01N 25/00; G01K 1/08
[52] U.S. Cl. .......................... 374/185; 374/28; 374/208
[58] Field of Search ................................ 374/185, 208; 338/22 R, 28

[56] References Cited

U.S. PATENT DOCUMENTS

| | | | |
|---|---|---|---|
| 3,913,058 | 10/1975 | Nishio et al. | 338/28 |
| 4,142,170 | 2/1979 | Blatter | 338/22 R |
| 4,228,128 | 10/1980 | Epser et al. | 338/22 R |
| 4,246,786 | 1/1981 | Wiemer et al. | 338/22 R |
| 4,246,787 | 1/1981 | Harper | 338/22 R |
| 4,294,801 | 10/1981 | Segawa et al. | 422/98 |
| 4,437,084 | 3/1984 | Clayton, Jr. | 338/22 R |
| 4,442,420 | 4/1984 | Novak | 338/28 |
| 4,630,477 | 12/1986 | Murtland, Jr. | 338/28 |
| 4,841,274 | 6/1989 | Yagher, Jr. et al. | 338/28 |
| 4,842,419 | 6/1989 | Neitert | 374/208 |
| 4,959,633 | 9/1990 | Kiraly et al. | 338/22 R |
| 4,987,749 | 1/1991 | Baier | 374/148 |
| 5,046,857 | 9/1991 | Metzger et al. | 374/135 |
| 5,139,345 | 8/1992 | Schafer et al. | 374/208 |
| 5,462,359 | 10/1995 | Reichl et al. | 374/208 |
| 5,481,240 | 1/1996 | Fukaya et al. | 338/22 R |
| 5,660,473 | 8/1997 | Noma et al. | 374/208 |
| 5,835,679 | 11/1998 | Eckman et al. | 392/503 |
| 5,949,324 | 9/1999 | Segler et al. | 338/22 R |

FOREIGN PATENT DOCUMENTS 5539006   3/1980   Japan ...................... 374/185

*Primary Examiner*—G. Bradley Bennett
*Assistant Examiner*—Gail Verbitsky
*Attorney, Agent, or Firm*—Welsh & Katz, Ltd.

[57] ABSTRACT

A thermistor including a pill assembly, a connector body, and an adhesive sealant. The pill assembly includes a thermistor pill and a conductive lead operably attached thereto. The conductive lead extends through the connector body. The adhesive sealant bonds with both the connector body and the conductive lead proximate to where the conductive lead extends through the connector body.

15 Claims, 2 Drawing Sheets

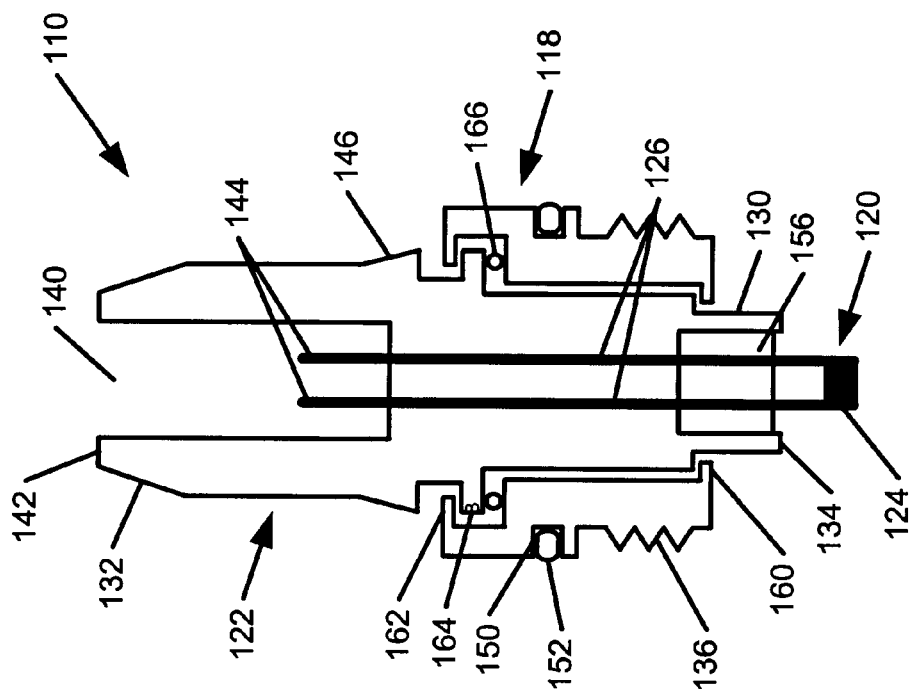
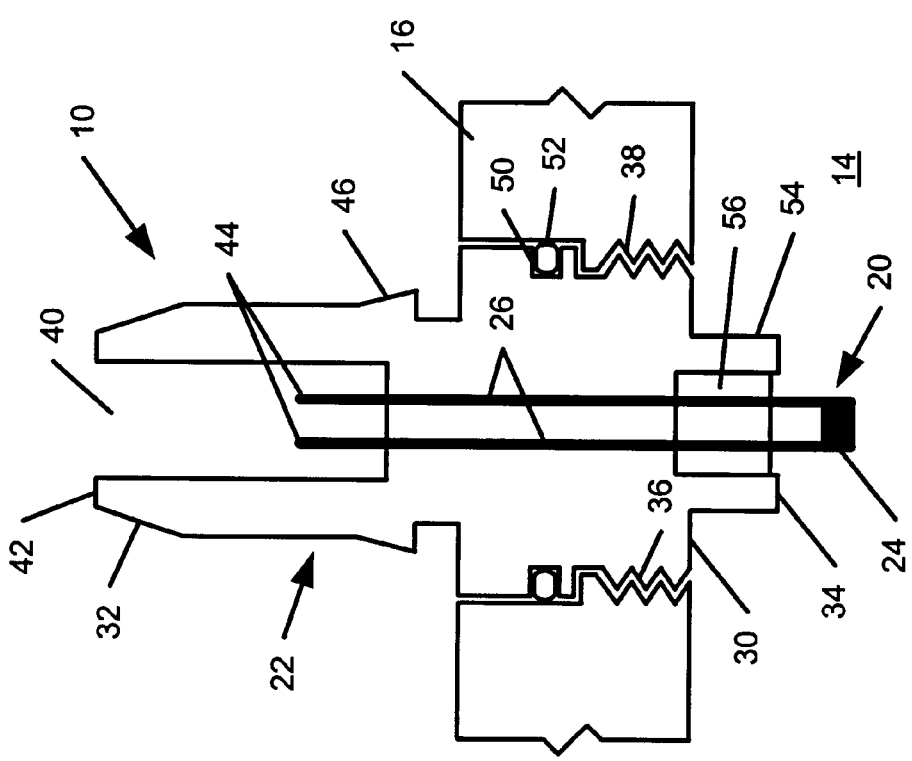

THERMISTOR

FIELD OF THE INVENTION

The present invention relates generally to a thermistor. More particularly, the present invention relates to a thermistor for monitoring temperature in a cooling system.

BACKGROUND OF THE INVENTION

Thermistors are used in a variety of applications to measure the temperature of materials. For example, thermistors are used to measure the temperature of various components in an internal combustion engine as well as other components in an automobile such as coolant lines in an air conditioning system.

To measure the temperature of the material with the thermistor, it is typically necessary to place the thermistor in intimate contact with the material whose temperature is being measured. To obtain intimate contact between the thermistor and the material, it is frequently necessary to form an aperture in the structure that holds the material. The aperture also typically permits the thermistor to be removably attached to the structure. To prevent escape of the material from the structure, an impervious seal must be formed between the thermistor and the structure as well as between the components in the thermistor.

One technique for preventing the escape of material through the components of the thermistor involves placing a cover over an end of the thermistor that extends into the structure. For example, Metzger et al., U.S. Pat. No. 5,046,857, describes preventing the material whose temperature is being measured from passing through the thermistor by placing a thermistor pill within an outer shell. Temperature of a material outside the outer shell is measured with the thermistor pill positioned in the outer shell. Similarly, Clayton, Jr., U.S. Pat. No. 4,437,084, discloses a thermistor in which a thermistor pill is encapsulated in an outer shell.

A drawback of these encapsulating techniques is that the accuracy of the temperature measurement is limited because the thermistor pill is not in direct contact with the material whose temperature is being measured. As such, temperature changes must be transmitted through the material that encompasses the thermistor pill.

A prior art technique for manufacturing a thermistor 300 that does not require the use of an outer shell uses a threaded nut 302 having a central bore 304, as most clearly illustrated in FIG. 4. A thermistor pill assembly 306 is retained in a fixed relation to the threaded nut 302 with a sealing glass 308, which bonds to both the threaded nut 302 and conductive leads 310 extending from a thermistor pill 312. The high temperature necessary to prepare the glass seal 308 typically causes the conductive leads 310 to weaken because of annealing. After the glass seal 308 is formed, it is necessary to plate the threaded nut 302 to reduce degradation of the threaded nut 302 during use.

Another technique for fabricating a thermistor that is not encapsulated is disclosed in Baier, U.S. Pat. No. 4,987,749. Baier indicates that the conductive wires that extend from the thermistor pill are mounted in a glass header. The header glass is soldered to the wall of the thermistor assembly to prevent refrigerant fluid from passing between the components of the thermistor.

BRIEF DESCRIPTION OF THE DRAWINGS

FIG. 1 is a sectional view of a thermistor according to the present invention;

FIG. 2 is a sectional view of an alternative configuration of the thermistor;

SUMMARY OF THE INVENTION

Figure 4:
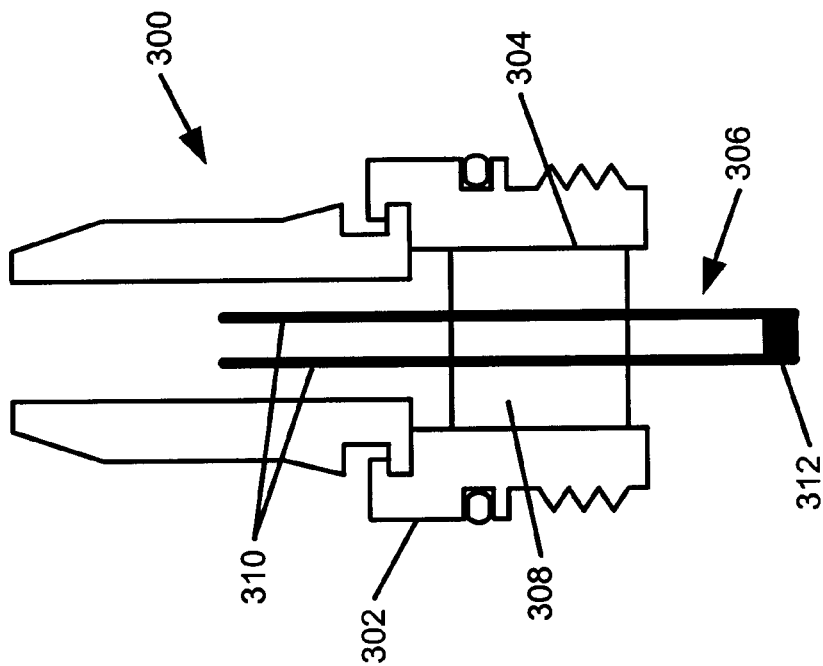
FIG. 4 is a sectional view of a prior art thermistor configuration.

The present invention is a thermistor for directly measuring a temperature of a material in an enclosure. The thermistor includes a pill assembly, a connector body, and an adhesive sealant. The pill assembly has a thermistor pill and a conductive lead operably attached thereto. The connector lead extends through the connector body. The adhesive sealant bonds with both the connector body and the conductive lead proximate to where the conductive lead extends through the connector body.

DETAILED DESCRIPTION OF THE INVENTION

While the present invention is susceptible of embodiments in various forms, there is shown in the drawings and will hereinafter be described presently preferred embodiments with the understanding that the present disclosure is to be considered an exemplification of the invention and is not intended to limit the invention to the specific embodiments illustrated.

The present invention is directed to a thermistor, as most clearly illustrated at 10 in FIG. 1. The thermistor 10 is in direct contact with a material 14 in a structure 16 for measuring the temperature of the material 14. The thermistor 10 prevents the material 14 from escaping through or around the thermistor 10.

The thermistor 10 is particularly suited for use in the structure 16 where the material 14 is maintained under a pressure that is greater than ambient pressure. One application where the thermistor 10 is suited for use is in an automobile air conditioning system. However, a person of ordinary skill in the art will appreciate that the thermistor 10 can be incorporated into a variety of other applications.

In a first preferred embodiment, the thermistor 10 includes a thermistor pill assembly 20 and a connector body 22. The thermistor pill assembly 20 has a thermistor pill 24 and at least one conductive lead 26 operably attached thereto.

Preferably, the thermistor pill 24 has a pair of conductive leads 26 attached thereto. The conductive leads 26 are attached to the thermistor pill 24 using conventionally known techniques. One such suitable technique for attaching the conductive leads 26 to the thermistor pill 24 involves soldering the conductive leads 26 to the thermistor pill 24.

The connector body 22 is molded over at least a portion of the conductive leads 26. The connector body 22 generally includes a first portion 30 and a second portion 32, which is opposite the first portion 30. The thermistor pill 24 is proximate an end 34 of the first portion 30 that is opposite the second portion 32.

The first portion 30 is used for attaching the thermistor 10 to the structure 16 containing the material 14 whose temperature is to be measured. Removably attaching the thermistor 10 to the structure 16 is preferably accomplished with a threaded region 36 on the first portion 30 that is substantially complementary to a threaded region 38 on the structure 16.

The second portion 32 is used for operably connecting the thermistor 10 to a control system (not shown) that monitors and/or records the temperature sensed by the thermistor 10. A person of ordinary skill in the art will appreciate that it is possible to use a variety of control systems in conjunction with the thermistor 10 of the present invention.

The second portion 32 preferably includes a recess 40 formed into an end 42 of the second portion 32 that is opposite the first portion 30. The recess 40 provides a socket for attaching the control system (not shown) to the thermistor 10. Ends 44 of the conductive leads 26, which are opposite the thermistor pill 24, extend into the recess 40.

The second portion 32 also preferably has an angled lip 46 extending from an outer surface thereof. The angled lip 46 assists to retain an attachment lead (not shown) from the control system (not shown) in conductive contact with the conductive leads 26.

Intermediate the first portion 30 and the second portion 32, the connector body 22 has a channel 50 formed therein. The channel 50 is adapted to receive a resilient O-ring 52. The O-ring 52 supplements the threaded region 36 to prevent the material whose temperature is being measured from escaping by passing between the thermistor 10 and the structure 16.

The end 34 of the first portion 30 preferably includes a recess 54 formed therein proximate where the conductive leads 26 extend through the end 34. The recess 54 is filled with an adhesive sealant 56 that forms a strong bond with both the conductive leads 26 and the connector body 22. The adhesive sealant 56 thereby prevents the material 14 whose temperature is being monitored from escaping by passing between the conductive leads 26 and the connector body 22.

Materials used for fabricating the connector body 22 resist degradation by the material 14 whose temperature is being monitored. For example, when the thermistor 10 is used in an air conditioning system, the connector body 22 is preferably fabricated to resist degradation by the refrigerant fluid as well as by any lubricants used therewith. Suitable materials for fabricating the connector body 14 include polyetherimide, polybutylene terephalate, or combinations thereof. A preferred commercially available polyetherimide may be obtained from General Electric Company through it GE Plastics business organization under the designation ULTEM. A preferred commercially available polybutylene terephalate may be obtained from General Electric Company through it GE Plastic business organization. under the designation VALOX.

The adhesive sealant used in the present invention is preferably an encapsulating epoxy. A preferred encapsulating epoxy for use with the present invention is marketed under the designation EP729S by Thermoset Plastics, Inc. (Indianapolis, Ind.).

In an alternative embodiment, which is illustrated in FIG. 2, the thermistor 110 includes a collar 118 that extends over at least a portion of a connector body 122. The collar 118 is particularly suited for use where a threaded region 136 must be capable of withstanding repeated stresses without exhibiting degradation that could occur when the thermistor 110 is repeatedly attached to and removed from the structure (not shown) where temperature is to be measured.

In addition to the connector body 122 and the collar 118, the thermistor 110 has a thermistor pill assembly 120. The thermistor pill assembly 120 includes a thermistor pill 124 and a pair of conductive leads 126 extending therefrom. The connector body 122 has a first portion 130 and a second portion 132. The connector body 122 is molded over at least a portion of the conductive leads 126 so that the thermistor pill 124 is proximate an end 134 of the first portion 130 that is opposite the second portion 132.

The second portion 132 is used for operably connecting the thermistor 110 to a control system (not shown) that monitors and/or records the temperature sensed by the thermistor 110. An end 142 of the second portion 132, which is opposite the first portion 130, preferably has a recess 140 formed therein. The recess 140 provides a socket for attaching the control system (not shown) to the thermistor 110. Ends 144 of the conductive leads 126, which are opposite the thermistor pill 124, extend into the recess 140.

Proximate the intersection of the first portion 130 and the second portion 132, the connector body 122 preferably has an angled lip 146 extending therearound. The angled lip 146 assists in retaining the control system (not shown) in a fixed relation with respect to the thermistor 110.

The collar 118 preferably includes a channel 150 formed therein. The channel 150 is adapted to receive a first resilient O-ring 152. The first resilient O-ring 152 supplements the threaded region 136 to prevent the material whose temperature is being measured from escaping by passing between the thermistor 110 and the structure (not shown) to which the thermistor 110 is attached.

The end 134 preferably includes a recess 154 formed therein proximate where the conductive leads 126 extend through the end 134. The recess 154 is filled with an adhesive sealant 156 that forms a strong bond with both the connector body 122 and the conductive leads 126. The adhesive sealant 156 thereby prevents the material whose temperature is being monitored from escaping by passing between the conductive leads 126 and the connector body 122.

To retain the collar 118 in a fixed relation with respect to the connector body 122, the collar 118 includes a first inwardly directed lip 160 and a second inwardly directed lip 162. The first inwardly directed lip 160 engages the connector body 122 proximate the first end 130. The second inwardly directed lip 162 engages an outwardly extending lip 164 that extends from the connector body 122 intermediate the first portion 130 and the second portion 132.

To prevent the material whose temperature is being measured from passing between the collar 118 and the connector body 122, a second O-ring 166 is preferably provided between the collar 118 and the connector body 122. The second O-ring 166 preferably seats against the outwardly extending lip 164 and a recess 168 on the collar 118.

Figure 3:
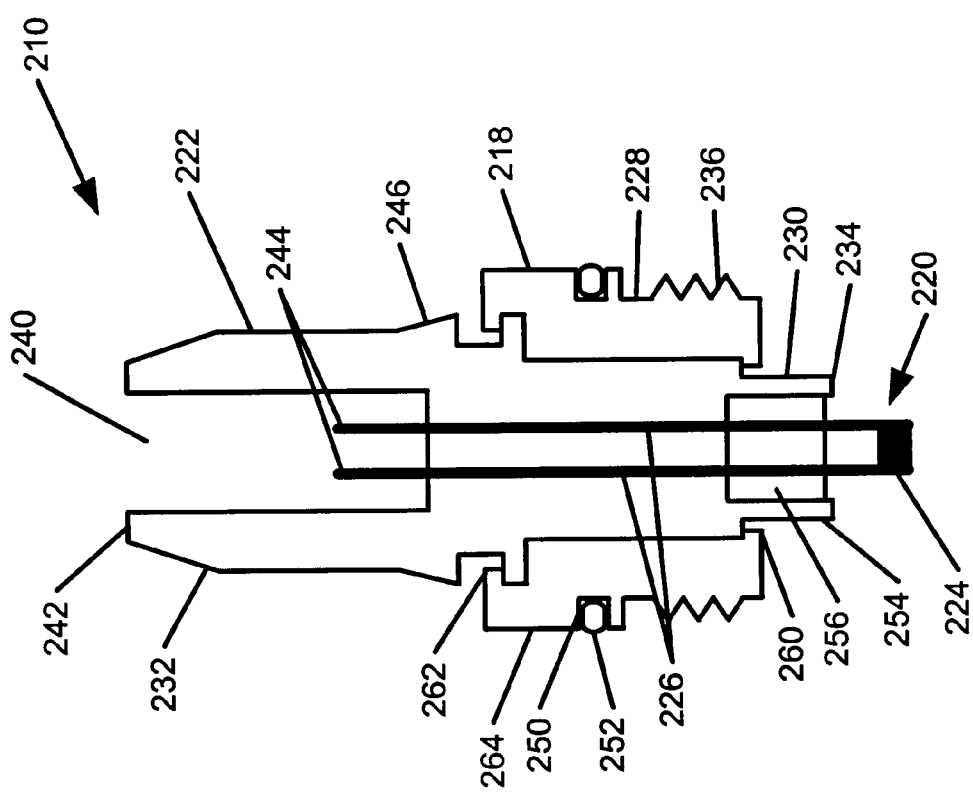
FIG. 3 is a sectional view of another alternative configuration of the thermistor.

In yet another embodiment, which is illustrated in FIG. 3, a thermistor 210 includes a collar 218 that extends over at least a portion of a connector body 222. The structure of the thermistor 210 in this embodiment is similar to the structure of the thermistor illustrated in FIG. 2 except that instead of using an O-ring to prevent the material whose temperature is being measured from passing between the collar 218 and the connector body 222, an adhesive sealant 228 is placed between the collar 218 and the connector body 222. The adhesive sealant 228 forms a strong bond with both the collar 218 and the connector body 222.

In addition to the connector body 214 and the collar 222, the thermistor 210 has a thermistor pill assembly 220. The thermistor pill assembly 220 includes a thermistor pill 224 and a pair of conductive leads 226 extending therefrom. The connector body 222 has a first portion 230 and a second portion 232. The connector body 222 is molded over at least a portion of the conductive leads 226 so that the thermistor pill 224 is proximate an end 234 of the first portion 230 that is opposite the second portion 232.

The second portion 232 is used for operably connecting the thermistor 210 to a control system (not shown) that monitors and/or records the temperature sensed by the thermistor 210. An end 242 of the second portion 232, which is opposite the first portion 230, preferably has a recess 240 formed therein. The recess 240 provides a socket for attaching the control system (not shown) to the thermistor 210. Ends 244 of the conductive leads 226, which are opposite the thermistor pill 224, extend into the recess 240.

Proximate the intersection of the first portion 230 and the second portion 232, the connector body 222 has an angled lip 246 extending therearound. The angled lip 246 assists in retaining the control system (not shown) in a fixed relation with respect to the thermistor 210.

The collar 218 includes a channel 250 formed therein. The channel 250 is adapted to receive a resilient O-ring 252. The O-ring 252 supplements the threaded region 236 to prevent the material whose temperature is being measured from escaping by passing between the thermistor 210 and the structure (not shown) to which the thermistor 210 is attached.

The end 234 preferably includes a recess 254 formed therein proximate where the conductive leads 226 extend through the end 234. The recess 254 is filled with an adhesive sealant 256 that forms a strong bond with both the connector body 222 and the conductive leads 226. The adhesive sealant 256 thereby prevents the material whose temperature is being monitored from escaping by passing between the conductive leads 226 and the connector body 222.

To further enhance the ability of the adhesive sealant to retain the collar 218 in a fixed position with respect to the connector body 222, the collar 218 includes a first inwardly directed lip 260 and a second inwardly directed lip 262. The first inwardly directed lip 260 engages the connector body 222 proximate the first end 230. The second inwardly directed lip 262 engages an outwardly extending lip 264 that extends from the connector body 222 intermediate the first portion 230 and the second portion 232.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A thermistor for directly measuring a temperature of a material in an enclosure, the thermistor comprising:
    a thermistor pill assembly comprising a thermistor pill and a conductive lead operably attached thereto;
    a connector body through which the conductive lead extends; and
    an adhesive sealant that bonds with the conductive lead and the connector body proximate to where the conductive lead extends through the connector body , wherein the thermistor pill directly contacts the material in the enclosure for measuring the temperature of the material and wherein the adhesive sealant prevents the material from escaping from the enclosure by passing between the conductive lead and the connector body.

2. The thermistor of claim 1, wherein the connector body includes a first portion and a second portion.

3. The thermistor of claim 2, wherein the first portion has a threaded section.

4. The thermistor of claim 2, wherein the connector body has a recess formed into an end of the first portion.

5. The thermistor of claim 2, wherein the connector body has a channel formed therein intermediate the first portion and the second portion, and wherein the channel is adapted to receive a resilient O-ring.

6. The thermistor of claim 1, and further comprising a collar that extends over at least a portion of the connector body.

7. The thermistor of claim 6, and further comprising a sealing means positioned between the connector body and the collar and forming an impervious seal therebetween.

8. The thermistor of claim 6, and further comprising a resilient O-ring positioned between the connector body and the collar and forming an impervious seal therebetween.

9. The thermistor of claim 6, wherein the collar has a threaded portion.

10. The thermistor of claim 6, wherein the collar has a channel formed therein, and wherein the channel is adapted to receive a resilient O-ring.

11. A thermistor for directly measuring temperature of a material in an enclosure, the thermistor comprising:
    a thermistor pill assembly comprising a thermistor pill and a pair of conductive leads extending therefrom;
    a connector body through which the conductive leads extend, wherein the connector body has a recess formed therein proximate to where the conductive leads extend through the connector body;
    a first adhesive sealant that at least partially fills the recess, wherein the first adhesive sealant bonds with the conductive leads and the connector body;
    a collar extending over at least a portion of the connector body, wherein the collar includes a threaded section; and
    a sealing means positioned between the connector body and the collar are thereby forming an impervious seal between the connector body and the collar, wherein the thermistor pill directly contacts the material in the enclosure for measuring the temperature of the material and wherein the adhesive sealant prevents the material from escaping from the enclosure by passing between the conductive lead and the connector body.

12. The thermistor of claim 11, wherein the first portion has a threaded section.

13. The thermistor of claim 11, wherein the collar has a channel formed therein, and wherein the channel is adapted to receive a resilient O-ring.

14. The thermistor of claim 11, wherein the sealing means is a resilient O-ring.

15. The thermistor of claim 11, wherein the sealing means is a second adhesive sealant.

* * * * *

UNITED STATES PATENT AND TRADEMARK OFFICE
CERTIFICATE OF CORRECTION

PATENT NO. : 6,082,895
DATED : July 4, 2000
INVENTOR(S) : Janicek, Alan J.

It is certified that error appears in the above-identified patent and that said Letters Patent is hereby corrected as shown below:

Title page, under item [56], "Attorney, Agent, or Firm" that presently reads "Welsh & Katz, Ltd." should be corrected to read -- Welsh & Katz, Ltd., Damian G. Wasserbauer, and Carl B. Horton. --

Signed and Sealed this

Twenty-seventh Day of March, 2001

*Attest:*

NICHOLAS P. GODICI

*Attesting Officer*   *Acting Director of the United States Patent and Trademark Office*